US008958663B1

(12) United States Patent  
Harvill et al.

(10) Patent No.: US 8,958,663 B1
(45) Date of Patent: Feb. 17, 2015

(54) AUTOMATED IMAGING OF CUSTOMIZABLE PRODUCTS

(71) Applicant: Zazzle Inc., Redwood City, CA (US)

(72) Inventors: Leslie Young Harvill, El Granada, CA (US); Robert Irven Beaver, III, San Francisco, CA (US)

(73) Assignee: Zazzle Inc., Redwood City, CA (US)

( * ) Notice: Subject to any disclaimer, the term of this patent is extended or adjusted under 35 U.S.C. 154(b) by 0 days.

(21) Appl. No.: 14/243,840

(22) Filed: Apr. 2, 2014

Related U.S. Application Data

(60) Provisional application No. 61/881,914, filed on Sep. 24, 2013.

(51) Int. Cl.
  *G06K 9/00* (2006.01)
  *G06Q 30/00* (2012.01)
  *G06T 7/00* (2006.01)

(52) U.S. Cl.
  CPC ..... *G06T 7/0042* (2013.01); *G06T 2207/30244* (2013.01)
  USPC ................ 382/318; 382/319; 705/26.5

(58) Field of Classification Search
  None
  See application file for complete search history.

(56) References Cited

U.S. PATENT DOCUMENTS

| | | | |
|---|---|---|---|
| 8,265,376 B2 * | 9/2012 | Tsuk et al. | 382/154 |
| 2004/0227752 A1 * | 11/2004 | McCartha et al. | 345/419 |
| 2009/0106126 A1 * | 4/2009 | Asano et al. | 705/26 |
| 2009/0109214 A1 * | 4/2009 | Harvill et al. | 345/419 |
| 2010/0036753 A1 * | 2/2010 | Harvill et al. | 705/27 |
| 2012/0047045 A1 * | 2/2012 | Gopikrishna et al. | 705/26.5 |
| 2012/0158535 A1 * | 6/2012 | Barrieau et al. | 705/26.5 |
| 2012/0218300 A1 * | 8/2012 | Hayakawa | 345/633 |
| 2013/0050218 A1 * | 2/2013 | Beaver et al. | 345/440 |

\* cited by examiner

*Primary Examiner* — Stephen R Koziol
*Assistant Examiner* — Sean Conner
(74) *Attorney, Agent, or Firm* — Hickman Palermo Truong Becker Bingham Wong LLP

(57) ABSTRACT

Techniques for automated imaging of customizable products are disclosed. In one embodiment, survey photographic images of a customizable product having one or more markers affixed upon the customizable product are received. Camera positions relative to the customizable product are automatically determined based on the plurality of survey photographic images. Associations between the determined camera positions and customizable attributes of the customizable product are stored. Non-survey photographic images of the same customizable product without at least some of the one or more markers are obtained. Based on determining that a particular non-survey photographic image is from a camera position that is near a particular determined camera position relative to the customizable product, and based on a particular association between the particular determined camera position and the particular customizable attribute, first data representing the particular non-survey photographic image is stored in association with second data identifying the particular customizable attribute.

20 Claims, 9 Drawing Sheets

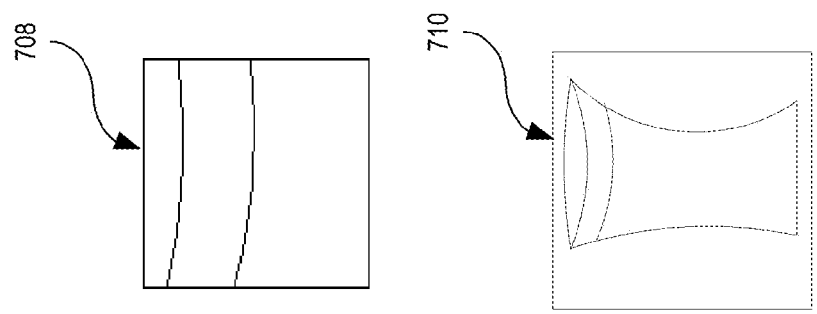
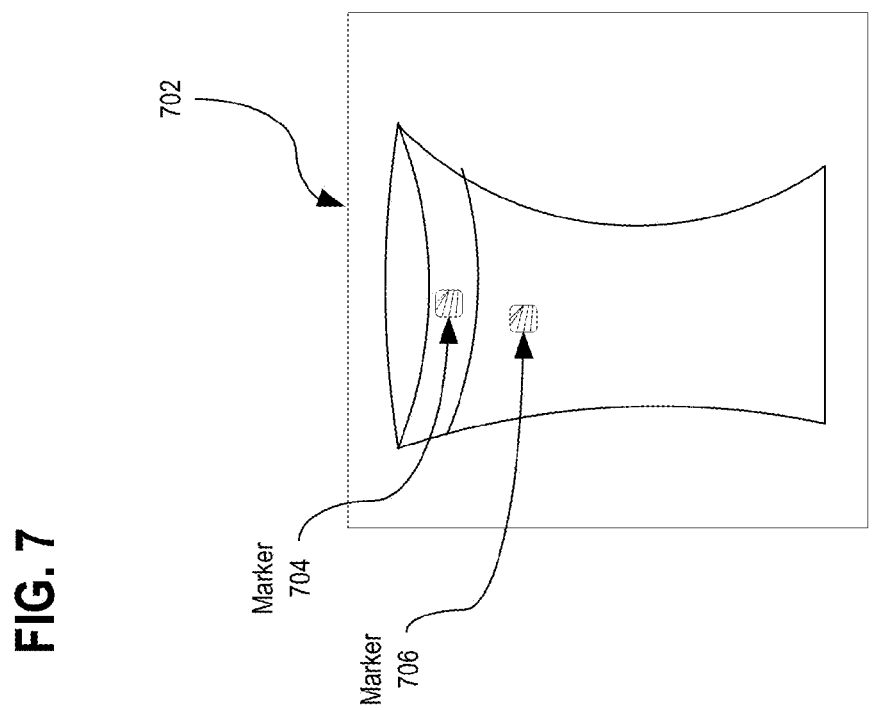
FIG. 7

US 8,958,663 B1

AUTOMATED IMAGING OF CUSTOMIZABLE PRODUCTS

This application claims the benefit under 35 U.S.C. §119 (e) of provisional application 61/881,914, filed Sep. 24, 2013, the entire contents of which is hereby incorporated by reference for all purposes as if fully set forth herein.

FIELD OF THE DISCLOSURE

The disclosure generally relates to automatic imaging of customizable products and, more specifically, to approaches for automatically determining positions for capturing photographic images of customizable products and approaches for automatically storing data associating photographic images of customizable products with customizable attributes or attribute options of the product.

BACKGROUND

Sellers of customizable products may display images of sample customizable products to help customers select customizable products and attribute options for customizing the selected customizable product. For example, a seller of a customizable handbag may display multiple images on its website of a customizable handbag including include an image depicting the strap portion of the bag for which the fabric may be customizable, an image depicting the inside portion of the handbag for which the lining may be customizable, an image depicting a 60225-0041 side portion of the handbag depicting for which an embellishment may be customizable. The image that is displayed may vary, for example, depending on the customizable attribute or attribution options that are selected by the user during an interaction with the website.

In some case, a seller may sell customizable products that are manufactured by third-parties. The process of obtaining photographic images of the customizable product that best depict individual customizable attributes or attribute options of the product may be cumbersome. The process may be especially cumbersome for a high-volume seller that sells many different customizable products, each of which have different customizable attributes and different options for each of the customizable attributes. Furthermore, the process of forming interface display instructions to cause display of the appropriate product image in the graphical interfaces in response to various user selections may be even more cumbersome given the numerous photographic images that are taken for each of the numerous customizable products being sold. Approaches for improving the imaging of customizable product are needed.

BRIEF DESCRIPTION OF THE DRAWINGS

In the drawings:

FIG. 7 illustrates an example overview attribute cluster image and an example detailed attribute cluster image corresponding to the same attribute cluster.

SUMMARY

Figure 1:
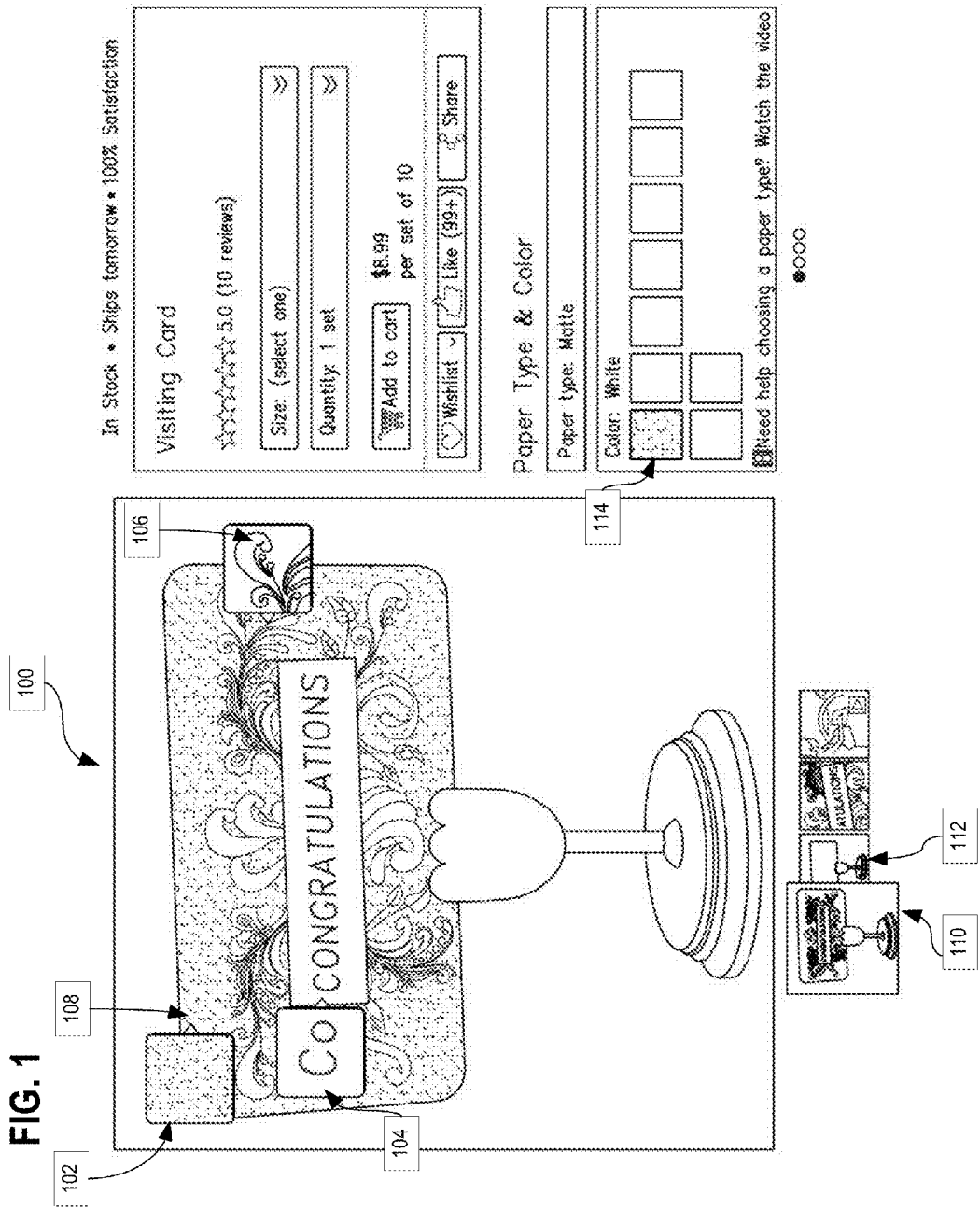
FIG. 1 illustrates an example graphical interface comprising images that may be obtained using certain approaches for automated imaging of customizable products described herein.

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
    2.1 Example Use Of Customizable Product Images And Automated Imaging Data
    2.2 Example Automated Imaging System
    2.3 Example Automated Imaging Processes
  3.0 Implementation Mechanisms—Hardware Overview
  1. General Overview Techniques for automated imaging of customizable products are described. In one embodiment, one or more markers are affixed upon a customizable product. The location of each marker upon the customizable product may correspond to a particular attribute or a grouping of attributes of the product which may be customized. For example, a marker representing the customizable attribute of fabric type may be affixed on a portion of the strap, at which the design of the fabric is best visible of the strap when photographed. The markers may be affixed by a manufacturer of the customizable product and photographed by a seller that is different than the manufacturer.

An automated imaging system may obtain survey photographic images of the customizable product from different survey camera positions relative to the customizable product. That is, the customizable product may be photographed from different angles or locations relative to the customizable product. The automated imaging system may determine non-survey camera positions relative to the customizable product for capturing photographs of the customizable product based on the survey photographic images. The non-survey camera positions may be different than the survey positions. The automated imaging system may store data associating the determined camera positions with corresponding customizable attributes of the customizable product.

Markers may be removed from the customizable product and non-survey photographic images of the customizable product may be obtained from camera positions relative to the customizable product that are near the determined non-survey camera positions. Data associating the non-survey photographic images with their corresponding one or more customizable attributes and/or customizable options may be automatically stored. For example, data representing a particular non-survey photographic image may be stored in association with data identifying a particular customizable attribute based on determining that the particular non-survey photographic image is taken from a certain camera position that is near a particular determined camera position relative to the customizable product and based on a particular association that indicates that the particular determined camera position is associated with the particular customizable attribute.

The data indicating associations between non-survey photographic images and customizable attributes may subsequently be used to automatically determine which photographic images should be displayed in response to each of a plurality of different customer selections, such as selections of customizable attributes or selections of particular options for the customizable attributes.

Using embodiments of approaches described herein, sellers of customizable products may avoid having to hand-select positions that best depict various customizable attributes or options of a customizable product and having to manually take photographs in each of the selected positions. Furthermore, after the photographic images are obtained, the seller may avoid the time-intensive task of having to review each individual photographic image and manually identify the one or more particular customizable attributes or customizable attribute options to which each individual image corresponds.

2. Structural and Functional Overview 2.1 Example Use of Customizable Product Images and Automated Imaging Data FIG. 1 illustrates an example graphical interface comprising images that may be determined using one or more approaches for automated imaging of customizable products described herein. Interface 100 is an interactive graphical interface which displays images that depict various attribute option for various customizable attributes of a customizable visiting card product. Interface 100 may be displayed at a customer device in response to the customer device accessing a web site of a seller that sells the customizable visiting card.

Option images 102, 104, and 106 each depict an attribute options for a customizable attribute of a visiting card. For example, option image 102 depicts the attribute option of White for the customizable attribute of color, option image 104 depicts the attribute option of Bellman for the customizable attribute of font style, and option image 106 depicts the customizable attribute option of Floral for the customizable attribute of background design In an embodiment, option images 102, 104, and 106 are displayed after receiving a selection of the corresponding attribute option from a customer device interacting with the graphical interface. For example, option image 102 may be displayed in response to receiving a selection of the attribute option 114 of White from a customer device. In other embodiments, each option image of option images 102, 104, 106 may display before receiving any selection of attribute options from the customer device. For example, each option image of option images 102, 104, 106 may correspond to a default attribute option for a customizable attribute and may display in response to the selection of the corresponding customizable attribute or before the selection of either a customizable attribute or attribute option.

Product images 110 and 112 both depict the same visiting card from different perspectives. Each product image may be associated with one or more customizable attributes. For example, product image 110, which depicts the front of the visiting card, may be associated with the customizable attributes of color, font style, and background design. Product image 112, which depicts the back of the visiting card, may be associated with the customizable attribute of back design.

In some embodiments, in response to receiving a selection of a customizable attribute or an attribute option from a customer device, the full sized version of the product image associated with the selected customizable attribute or attribute option may be displayed. For example, the full size version of product image 112 may be displayed in response receiving a selection of the customizable attribute of back design or the attribute option of No Design from a customer device.

Each customizable attribute may be associated with an attribute location upon a product image. For example, the customizable attribute of color, to which option image 102 corresponds, is associated with attribute location 108. In interface 100, attribute location 108 is indicated by the arrow attached to image 102, which points to attribute location 108, indicating that attribute location 108 is associated with the customizable attribute to which image 102 corresponds. In other embodiments, attribute locations may be indicated in other ways, such as by being annotated with a symbol. An attribute location may be the location upon the product that best depicts the attribute to which the location corresponds. For example, attribute location 108 corresponds to the customizable attribute of color and attribute location 108 is at a location of the customizable card at which the color is clearly visible.

According to certain embodiments of automated imaging processes described herein, an automated imaging system may automatically determine camera positions for obtaining option images 102, 104, 106. Furthermore, certain embodiments of automated imaging processes described herein may automatically store data representing option images 102, 104, and 106 in association with data identifying their corresponding customizable attributes and attribute options. Additionally, certain embodiments of automated imaging processes may also automatically determine the attribute locations corresponding to each customizable attribute, such as attribute location 108, and product images that correspond to groups of customizable attributes, such as product images 110 and 112. The automated imaging process may comprise storing data identifying the attribute locations and product images in association with data identifying corresponding customizable attributes and/or attribute options In other embodiments, the attribute option images or product images may be displayed in other ways in different types of graphical interfaces. Additionally, or instead, other types of images depicting the customizable product may be obtained using automated imaging processes described herein.

2.2 Example Automated Imaging System

Figure 2:
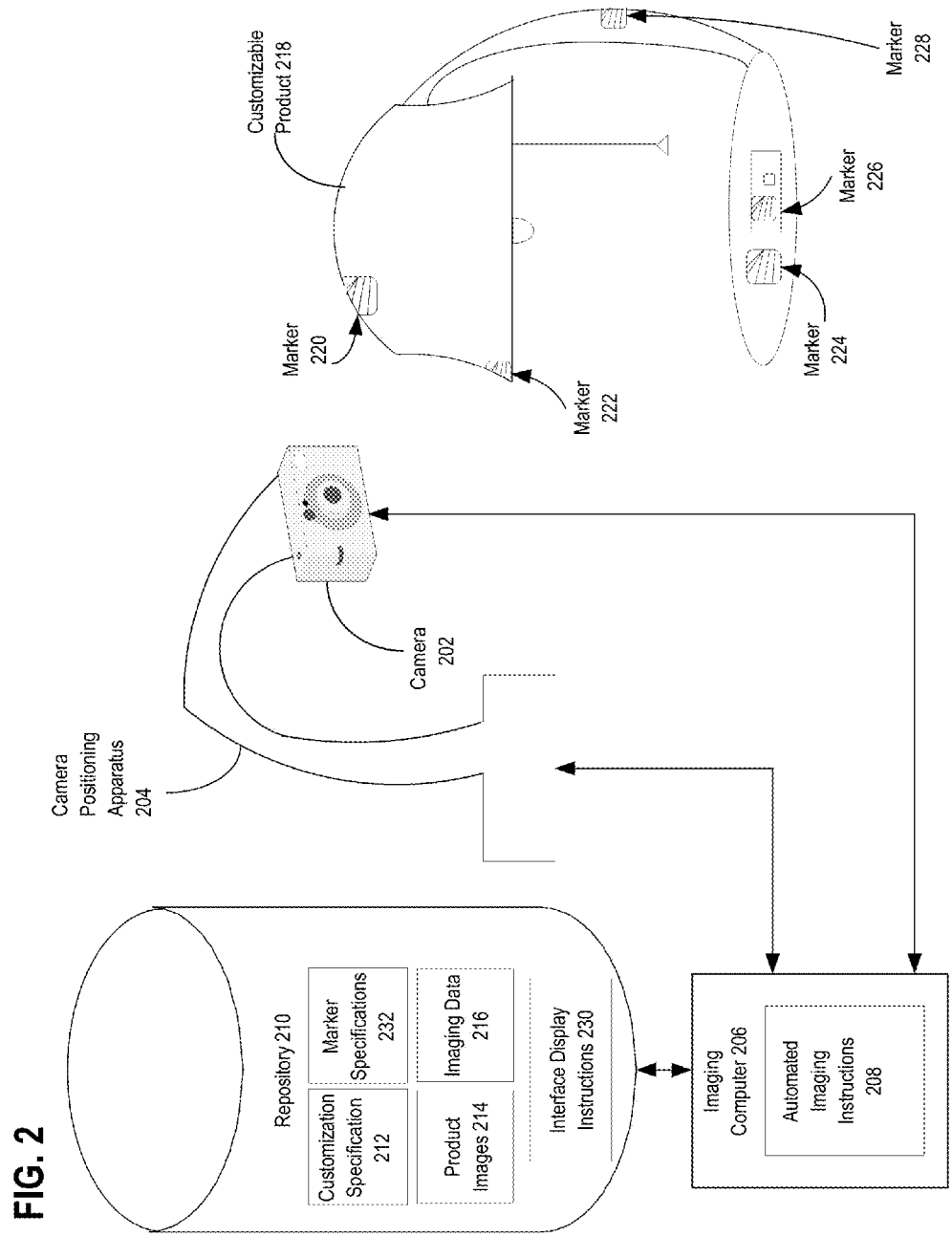
FIG. 2 illustrates an example automated imaging system for the automated imaging of customizable products.

FIG. 2 illustrates an example automated imaging system for the automated imaging of customizable products. Customizable product 218 is a customizable lamp with various markers affixed upon the customizable lamp including markers 220, 222, 224, 226, and 228. Markers may be affixed upon a customizable product using an adhesive, fastener, or any other attaching mechanism.

Camera positioning apparatus 204 may be coupled to camera 202 and may be configured to control the positioning of camera 202 relative to the customizable product 218. For example, camera positioning apparatus 204 may position camera 202 at various angles and at various locations around customizable product 218. In other embodiments, customizable product 218 may change locations and/or angles relative to camera 202 while camera 202 remains in a fixed location, or both camera 202 and customizable product 218 may change locations and/or angles relative to each other. For example, in some embodiments, customizable product 218 may be affixed to a product positioning apparatus configured to control the positioning of customizable product 218 relative to camera 202.

Imaging computer 206 represents one or more computers configured to cause the automated imaging of customizable product 218. Imaging computer 206 may control the positioning of camera 202 by sending positioning instructions to camera positioning apparatus 204. Imaging computer 206 may cause photographic images of customizable product 218 to be taken by camera 202 by sending instructions to camera positioning apparatus 204 or camera 202. In some embodiments, a plurality of camera may be configured to photograph customizable product 218 from different locations and/or angles relative to customizable product 218 and imaging computer 206 may be configured to control the positioning of each of the plurality of cameras. In some embodiments, imaging computer 206 may also be configured to control the positioning of lights relative to customizable product 218.

Imaging computer 206 may store data at, and retrieve data from, repository 210 including customization specification 212, marker specifications 232, product images 214, imaging data 216, and interface display instructions 230. Customization specification 212 may identify the various customizable attributes of customizable product 218 and, for each of the various customizable attributes, the various options for the customizable attributes. The information contained in customization specification 212 may be specified by a manufacturer of customization product 218.

Imaging computer 206 may determine marker specifications 232 based on customization specification 212. Marker specifications 232 may comprise information relating to markers 220, 222, 224, 226, and 228, such as an identification of the marker design in each of the markers, which may be used by imaging computer 206 to recognize one or more of the markers. Marker specifications 232 may also identify, for each of markers 220, 222, 224, 226, and 228, the customizable attribute(s) and/or attribute option(s) to which each marker corresponds.

Product images 214 may comprise photographic images of a customizable product, such as option images 102, 104, and 106 and product images 112 and 114. Imaging data 216 may comprise various information determined during the automated imaging process including, for each image of product images 214, data indicating the customizable attribute and/or customizable options to which the product image corresponds. Imaging data 216 may also include, in some embodiments, mappings of camera positions to customizable attributes and/or customizable options. Imaging data 216 may further identify various attribute clusters and may indicate which customizable attributes belong to each attribute cluster. Imaging data 216 may also identify mappings of camera positions to attribute clusters and mappings of attribute locations to customizable attributes.

Interface display instructions 230 may comprise instructions for causing display of graphical interfaces at client devices, where the graphical interfaces comprise product images of a customizable product. Imaging computer 206 may determine interface display instructions 230 based on imaging data 216.

Imaging computer 206 may determine product images 214, imaging data 216, and interface display instructions 230 using one or more automated imaging processes and may cause product images 214, imaging data 216, and interface display instructions 230 to be stored at repository 210. Automated imaging instructions 208 may comprise instructions for causing performance of one or more automated imaging processes described herein.

2.3 Example Automated Imaging Processes

Figure 3:
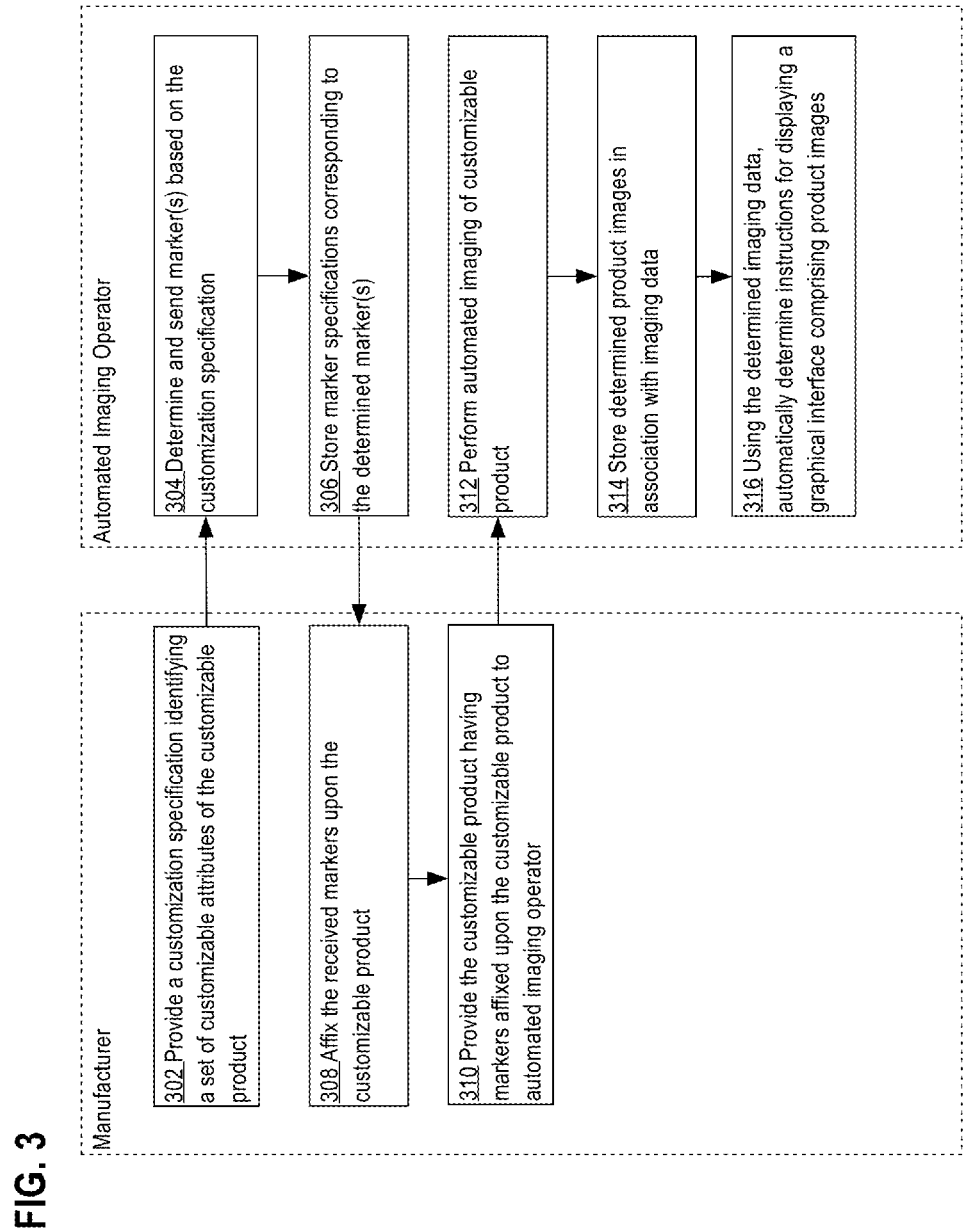
FIG. 3 illustrates an example process for initiating the automated imaging process and using the data determined during the automated imaging process.

FIG. 3 illustrates an example process for initiating the automated imaging process and using the data determined during the automated imaging process. In an embodiment, a first portion of the example process is performed by a manufacturer and a second portion of the example process is performed by an automating image operator. The automated imaging operator may be a seller that sells a plurality of different customizable items from a plurality of different manufacturers or a third-party automated imaging operator.

At block 302, the manufacturer provides a customization specification identifying a set of customizable attributes of the customizable product to the automated imaging operator. Each manufacturer may submit a different customization specification for each customizable product manufactured by the manufacturer. The customization specification may also identify attribute options for each of the customizable attributes.

At block 304, the automated imaging operator determines and sends marker(s) based on the customization specification. At block 306, automated imaging operator stores marker specifications corresponding to the determined marker(s). The automated imaging operator may send a marker for each attribute option of each customizable attribute of the customizable product to the manufacturer.

Automated imaging operated may print the markers on paper or other material and deliver hard copies of the marker to the manufacturer. The automated imaging operator may also or instead send the markers to the manufacturer electronically and the manufacturer may print the markers upon receipt.

According to various embodiments, the design of a marker may comprise any combinations of shapes, designs, and/or text. In an embodiment, the design of each marker sent for use on a single customizable product is uniquely identifiable when photographed. For example, each marker design may comprise a unique barcode or a unique combination of geometric shape(s) not included in other marker designs for the same customizable product.

Based on the design of a marker as depicted in a photographic image, imaging computer 206 may identify the customizable attribute(s) and/or attribute option(s) to which the marker corresponds. Marker specifications 232 may comprise information, which may be used by imaging computer 206 to identify the customizable attribute(s) or customizable option(s) to which a marker corresponds based on a photographic image of the marker. For example, the marker specification may indicate, for each of a plurality of bar codes or geometric shapes, the customizable attribute(s) and/or customization option(s) that correspond to the bar code or geometric shape.

In some embodiments, the markers sent to the manufacturer may be of different sizes. The amount of product surrounding the marker that is visible in a photograph corresponding to the marker may vary depending on the size of the marker. For example, if a marker is small, camera 202 may be positioned closer to the marker or a greater amount of zoom may be used when photographing the region of a product corresponding to a marker as compared to a larger marker.

According to some approaches, the manufacturer may specify a marker size for each customizable attribute or attribute option. For example, the manufacturer may request a small marker for the customizable attribute of fabric type. As a result, the image corresponding to the fabric type attribute may be photograph of a small portion of the product where the details of the fabric are more clearly visible. In contrast, the manufacturer may request a large marker for the customizable attribute of body shape, because the body shape may be more visible in an image where a greater amount of the product is visible. In other embodiments, the markers may not be of different sizes when received but the manufacturer may trim the sizes of markers within a certain designated area if a relatively close-up photograph is desired for the corresponding customizable attribute or attribute option.

In an embodiment, imaging computer 206 automatically performs the steps of blocks 304 and/or 306 in response to receiving a customization specification.

At block 308, the manufacturer affixes the received markers upon the customizable product. The automated imaging operator may send instructions with the markers indicating which customizable attribute and/or attribute option each marker corresponds to.

The manufacturer may affix each marker upon a location of the customizable product that best depicts the features of the customizable attribute(s) corresponding to the marker when photographed. For example, a manufacturer of customizable product 218 may affix marker 226, which corresponds to the customizable attribute of switch plate color, upon the switch plate. The manufacturer may affix marker 222, which corresponds to the customizable attribute of shade edge pattern, upon the portion of the lamp shade where the manufacture believes the edge pattern is most prominent or appears the best. The manufacturer may affix marker 220, which corresponds to the customizable attribute of shade shape and a location where the shape of the shade is most clearly visible. If the size of marker 220 is larger than marker 222, imaging computer 206 may include a larger portion of the lamp when photographing the location of the customizable product corresponding to marker 220 than when photographing the location of the customizable product corresponding to marker 222. The manufacturer may have chosen a larger size marker for the customizable attribute of shade shape because the shape of the lamp shade may be more clearly visible when a large portion of the lamp shade is depicted in a photographic image rather than a small portion.

In some embodiments, the manufacturer affixes the markers upon the customizable product and, in other embodiments, the automating image operator or another party affixes the markers upon the customizable product. Since the manufacturer is likely to be more familiar with the product than the seller is, the manufacturer may, in some cases, be in a better position to select the locations of the product that best depict the corresponding customizable attributes and/or attribute options.

At block 310, the manufacturer provides the customizable product having markers affixed upon the customizable product to the automated imaging operator. According to some embodiments, the manufacturer may ship the customizable product to the automated imaging operator site or may hand-deliver the customizable product to an automated imaging operator site. In an embodiment, the automated imaging operator may also send a fixture in addition to the markers to the manufacturer and the manufacturer may attach the customizable product to the fixture before sending the customizable product to the automated imaging operator.

Figure 4:
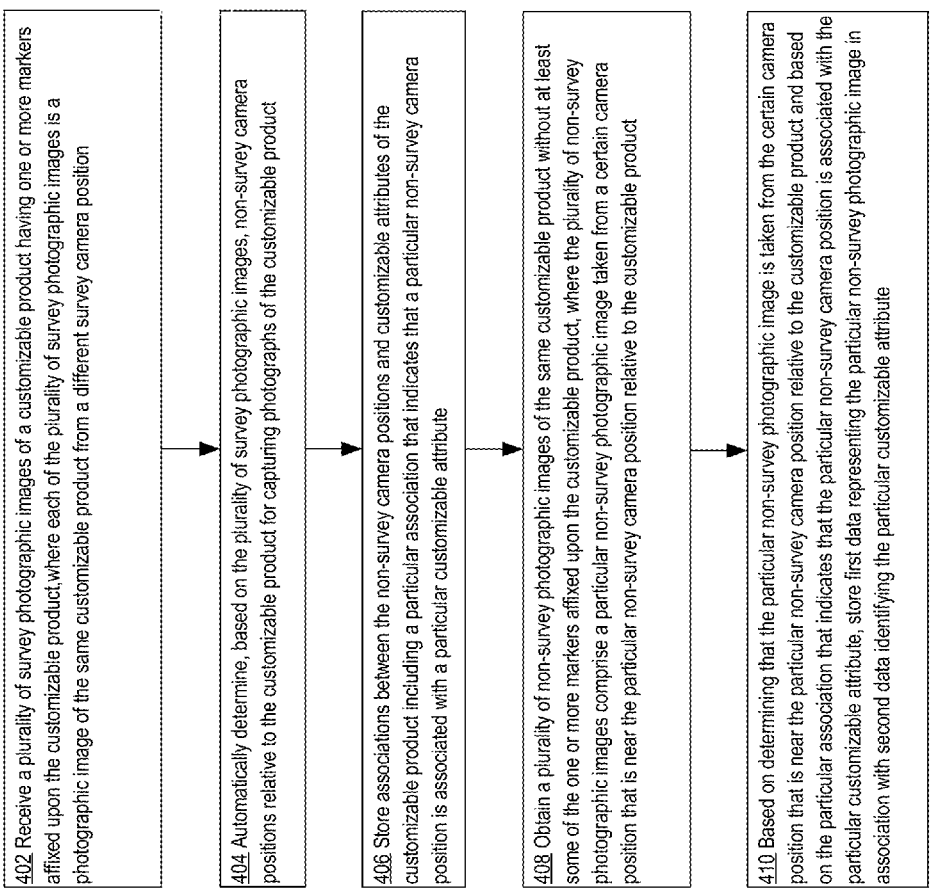
FIG. 4 illustrates an example process for automatically determining positions for the automated imaging of a customizable product and automatically storing data associating images with customizable attributes of a customizable product.

At block 312, automated imaging operator performs the automating imaging of the customizable product. FIG. 4 illustrates an example process of automated imaging including automatically determining positions for the automated imaging of a customizable product and automatically storing data associating images with customizable attributes of a customizable product.

At block 314, automated imaging operator stores determined product images in association with imaging data. The automated imaging operator may determine product images 214 and imaging data 216 as a result of the automating imaging of the customizable product. The determined automated imaging data may indicate, for each product image in product images 214, the customizable attribute(s) and/or attribute option(s) to which the product image corresponds. Imaging data 216 may further identify an attribute location for each of the customizable attributes. Each attribute location may be a location upon the customizable product. In some embodiments, imaging data 216 may also indicate, for each customizable attribute, which attribute options is a default attribute option for a customizable attribute or which product image is a default product image for a customizable attribute.

The determined automated imaging data may identify, for each product image, the view type of the product image. In an embodiment, imaging computer 206 causes photographic images of different view types to be taken, including attribute images, detailed attribute cluster images, and overview attribute cluster images. Product images 214 may comprise an attribute image for each marker that was affixed upon customizable product 218. An attribute image for a marker may include the particular area of customizable product 218 that was marked by the marker and a portion of the surrounding area. For example, if each a marker covers a portion of the surface of customizable product 218, an attribute image for a marker may depict the surface of customizable product 218 covered by the marker and, in addition, an amount of the surrounding surface. The amount of the surrounding surface included in the attribute image may be proportional to the size of the marker, where a large amount of surrounding surface is included in the attribute image if the size of the marker is large.

Product images 214 may also comprise one or more detailed attribute cluster images and overview attribute cluster images that each correspond to a marker cluster. According to an embodiment, in a detailed attribute cluster image of a particular cluster, the areas of customizable product 218 that were marked by the markers of the particular cluster are depicted in addition to a portion of the area surrounding the cluster of markers. According to an embodiment, in an overview attribute cluster image of a particular cluster, the areas of customizable product 218 that were marked by the markers of the particular cluster are depicted in addition the entire product as visible from a particular perspective. The location of the camera, angles of the camera, distance of the camera from the product, and/or or zoom amount may be different for a position corresponding to an overview attribute cluster view of a marker cluster than the position corresponding to the detailed attribute cluster view of the same marker cluster.

FIG. 7 illustrates an example overview attribute cluster image and an example detailed attribute cluster image corresponding to the same attribute cluster. Survey image 702 is a survey image of a customizable vase with markers 704 and 706 affixed upon the customizable vase. Imaging computer 206 may determine that markers 704 and 706 belong to the same marker cluster. Based on the determination that markers 704 and 706 belong to the same cluster, imaging computer 206 may determine a position corresponding to an overview attribute cluster view of a cluster of markers 704 and 706 and a different position corresponding to a detailed attribute cluster view of the same cluster. Detailed attribute cluster image 708 may be a photographic image taken from the position corresponding to the detailed attribute cluster view after the markers are removed from the vase. Overview attribute cluster image 710 may be a photographic image taken from the position corresponding to the overview attribute cluster view after the markers are removed from the vase. In detailed attribute cluster image 708, the entire surface of the vase is not visible. Instead, only the areas of the customizable vase that were marked by the markers 704 and 706 are depicted in addition to a portion of the area surrounding the cluster of markers. In overview attribute cluster image 710, the entire surface of the vase as visible from a particular perspective is depicted. The entire surface of the vase as visible from the particular perspective includes the area of the vase upon which the markers belonging to the cluster were located.

At block 316, using the determined imaging data, imaging computer 206 automatically determines instructions for displaying a graphical interface comprising product images. For example, imaging computer 206 may automatically determine interface display instructions 230 based on the determined associations between product images and customizable attributes, associations between product images and attribute options, associations between attribute locations and customizable attributes, and/or identifications of view types stored in association with the product images.

The instructions for displaying the graphical interface may cause certain product images to appear or animate in response to the selection of the corresponding customizable attribute or attribute option. For example, based on a stored association in imaging data 216 that indicates that a particular product image is an attribute image of the wood option for the "base material" customization attribute, imaging computer 206 may determine interface display instructions 230 that cause the particular product image to display in response to the selection of the wood option. Based on data indicating an association between a particular product image and a customization option of "fabric type" and data indicating that the particular product image is the default image for the customizable attribute of "fabric type," interface display instructions 230 may cause the particular product image to be selected when the customization option of "fabric type" is selected. In another embodiment, interface display instructions 230 may cause a particular detailed attribute cluster image to be displayed in response to receiving a selection of customizable attribute belonging to a particular cluster based on data indicating that the particular detailed attribute cluster image is associated with the particular cluster.

Imaging computer 206 may determine interface display instructions 230 that cause the text or options displayed on the graphical interface to change in response to the selection of a product image. For example, in response to the selection of a particular overview attribute cluster image corresponding to a particular attribute cluster, interface display instructions 230 may cause the names of the customizable attributes belonging to the attribute cluster of the image to display, along with data representing the attribute options for each of the customizable attributes.

Based on the associations between attribute locations and customizable attributes identified in imaging data 216, imaging computer 206 may determine interface display instructions 230 that cause an annotation of an attribute locations to display or animate in response to a particular event, such as the selection of a customizable attribute corresponding to the attribute location.

In some embodiments, due to the automation of selecting photographing positions, obtaining photographic images of a customizable product, and determining instructions for displaying the photographic images, a seller of a customizable product may obtain and disseminate images of the customizable product to potential customers with minimal human involvement.

A manufacture may send multiple customized products or portions thereof for imaging to the automated imaging operator. The different customized products may be different versions of the same customizable product. For example, a manufacturer may send a first customizable lamp customized with a rounded shade shape and a gold switch plate color as well as a second customizable lamp customized with a square shade shape and a silver switch plate color. The product images determined by the automated imaging of both versions of the customizable lamp may be displayed in the same graphical interface that identifies different customizable attributes and attribute options for the customizable lamp.

In some embodiments, instead of sending entire customized products, the manufacturer may send portions of customized product in some embodiments. For example, the manufacturer may send two different versions of just the bottom portion of the lamp without the lamp shade for imaging, where the first version comprises a gold switch plate color and the second version comprises a silver switch plate color.

FIG. 4 illustrates an example process for automatically determining positions for the automated imaging of a customizable product and automatically storing data associating images with customizable attributes of a customizable product. The process of FIG. 4 may be performed at imaging computer 206.

At block 402, imaging computer 206 receives a plurality of survey photographic images of a customizable product having one or more markers affixed upon the customizable product, where each of the plurality of survey photographic images is a photographic image of the same customizable product from a different survey camera position. The survey photographic images may be digital images or may be in some other format. Imaging computer 206 may cause the survey photographic images of the customizable product to be captured by instructing camera positioning apparatus 204 to position the camera at a plurality of different survey positions relative to customizable product 218. In an embodiment, the number of the survey photographic images and the positions from where they are taken are sufficient to ensure that each portion of each surface of the customizable product is depicted in at least one survey photographic image.

The obtained survey photographic image may be stored in association with position data indicating, for each survey photographic image, the position of the camera relative to the customizable product at the time when the survey photographic image was taken.

Figure 8:
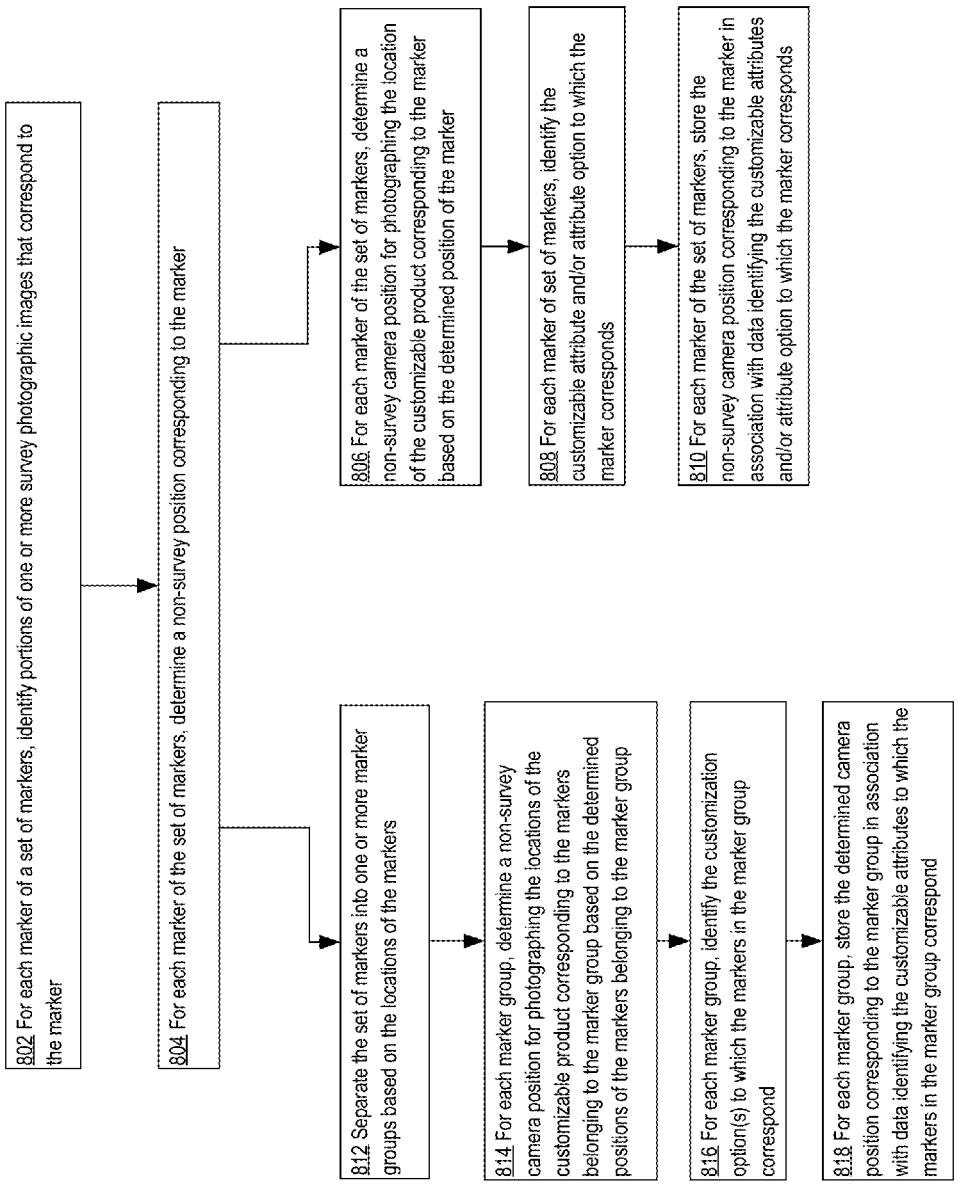
FIG. 8 illustrates an example process of determining example automated imaging position data that may be used to obtain images of the customizable product and of storing images of the customizable product with imaging data.

At block 404, imaging computer 206 automatically determines, based on the plurality of survey photographic images, non-survey camera positions relative to the customizable product for capturing photographs of the customizable product. The non-survey camera positions may be determined based on an analysis of the markers depicted in the plurality of survey photographic images. FIG. 8 illustrates an example process for determining camera positions based on a plurality of survey photographic images.

Figure 5:
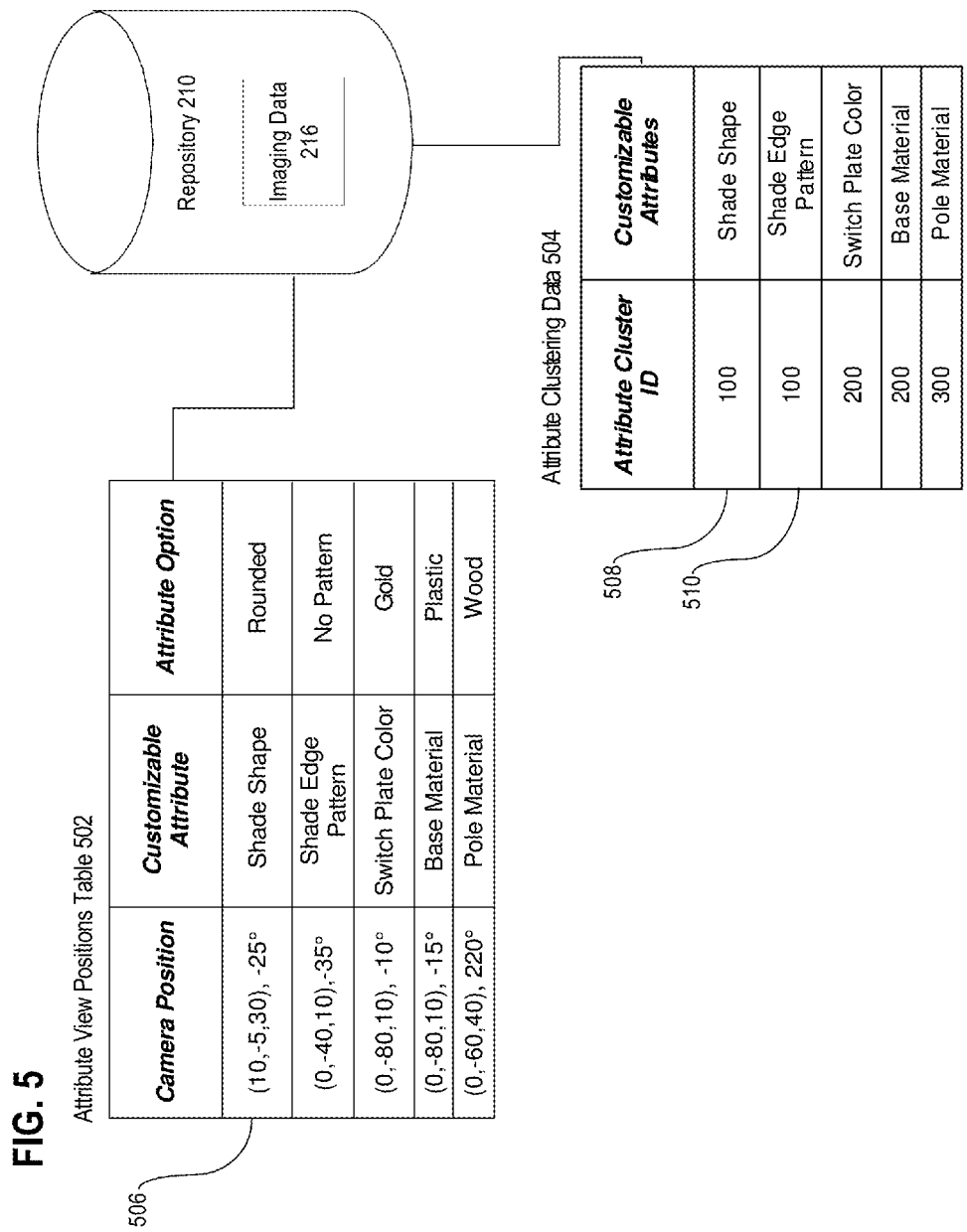
FIG. 5 illustrates example automated imaging position data that may be determined and used in an example automated imaging approach.
Figure 6:
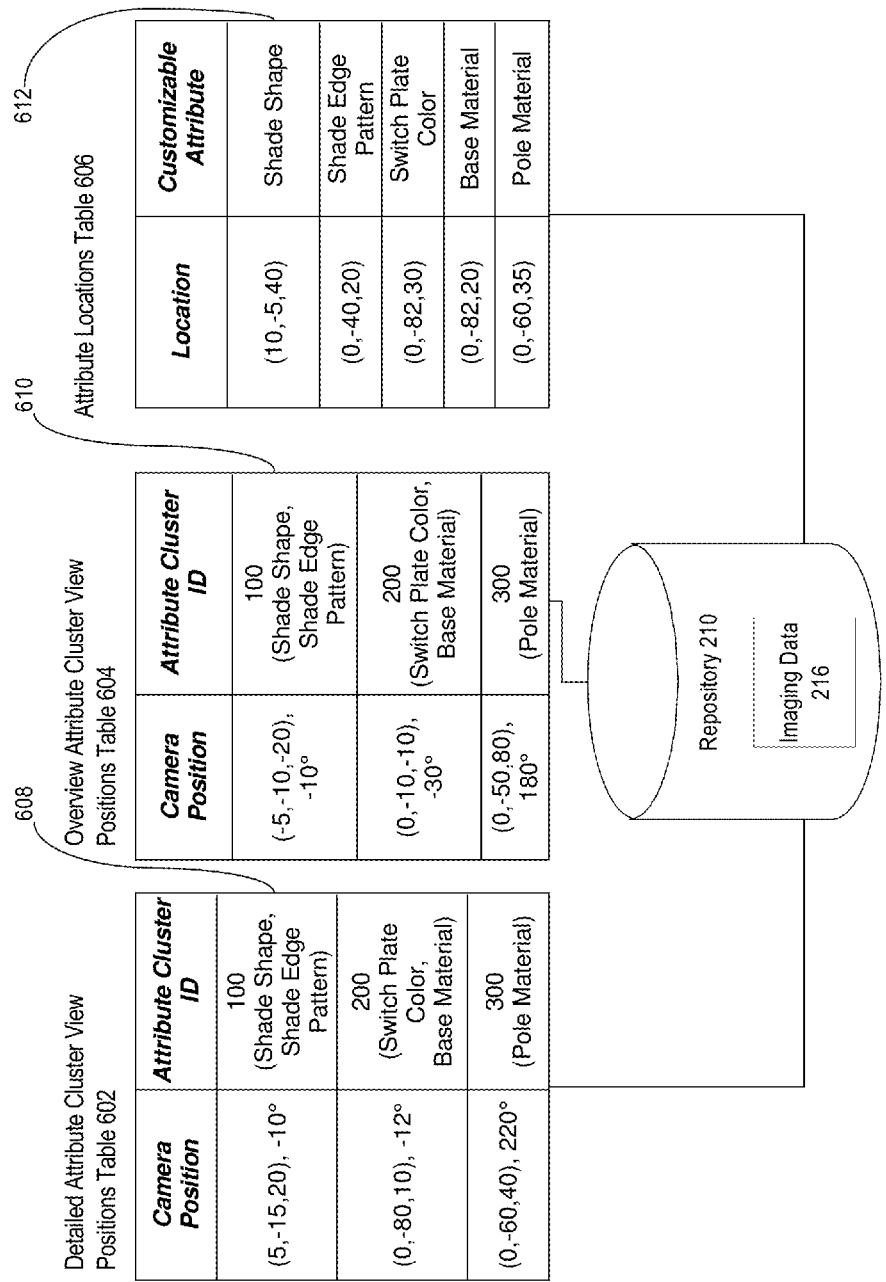
FIG. 6 illustrates example automated imaging position data that may be determined and used in an example automated imaging approach.

At block 406, imaging computer 206 stores associations between the non-survey camera positions and customizable attributes of the customizable product including a particular association that indicates that a particular non-survey camera position is associated with a particular customizable attribute. FIG. 5 and FIG. 6 illustrate example automated imaging position data that may be determined and used in an example automated imaging approach. The position data illustrated in FIG. 5 and FIG. 6 may be determined by imaging computer 206 and stored in repository 210.

Attribute view position table 502 comprises example attribute view positions that may be determined for the markers affixed upon customizable product 218. Attribute view position table 502 comprises a camera position for each of the markers. For example, imaging computer 206 may store association 506 in response to determining that marker 220 would be sufficiently forward facing and centered if the marker were photographed from location (10,−5, 30) relative to a fixed position and at an angle of −25°. For clarity, an embodiment showing single angle relative to the axis of an object enclosing cylinder is shown. Another embodiment may position the camera using an axis-amount representation comprised of a normalized 3-space vector and an angle. Another embodiment may specify the camera orientation by specifying a marker or point on the customizable product, and a normalized 3-space vector that specifies the vertical (up) vector for the image.

In attribute view position table 502, the camera position for each of the markers is stored in association with data identifying the customizable attribute and the attribute option to which the marker corresponds. For example, imaging computer 206 may determine, based on the design of marker 220 visible in the survey photographic images, that marker 220 corresponds to a particular marker identified in marker specifications 232 and marker specifications 232 may indicate that the particular marker is associated with the customizable attribute of shade shape and attribute option of rounded. Based on the determination that that the particular marker is associated with the customizable attribute of shade shape and attribute option of rounded, imaging computer 206 may store attribute 506, which indicates that camera position determined for marker 220 is associated with the customizable attribute of shade shape and attribute option of rounded.

Detailed attribute cluster view positions table 602 comprises example detailed attribute cluster view positions that may be determined for attribute clusters of customizable product 218. Overview attribute cluster view positions table 604 comprises example overview attribute cluster view positions that may be determined for attribute clusters of customizable product 218.

For example, imaging computer 206 may store association 608 in response to determining that the markers representing the customizable attributes of shade shape and shade edge pattern, which both belong to attribute cluster 100, would appear sufficiently forward facing and centered if photographed from location of (5,−15, 20) relative to a fixed position and at an angle of −10°. Imaging computer 206 may store association 610 in response to determining that the markers representing the attributes of shade shape and shade edge pattern would appear sufficiently forward facing and centered when photographed from location of (−5,−10,−20) relative to a fixed position and at an angle of −10°, and that the entire surface of customizable product 218 visible from a particular perspective would be depicted in the photograph.

In some embodiments, a marker may be associated with multiple customizable attribute and/or attribute option. For example, a particular marker may be associated with both the customizable attributes of fabric type and fabric color. In such an embodiment, imaging computer 206 may store an association between the position determined based on the particular marker and both the customizable attributes of fabric type and fabric color.

FIGS. 5 and 6 illustrate merely examples of data for different types of views for which positions and photographic images may be obtained. In other embodiments, imaging computer 206 may determine positions for other types of views. Additionally, other embodiments may store data identifying the determined positions in alternate formats.

At block 408, imaging computer 206 obtains a plurality of non-survey photographic images of the same customizable product without at least some of the one or more markers affixed upon the customizable product, where the plurality of non-survey photographic images comprise a particular non-survey photographic image taken from a certain camera position that is near the particular non-survey camera position relative to the customizable product. An automated imaging operator may remove each of the markers affixed upon the customizable product. In response to receiving an indication that the markers have been removed, imaging computer 206 may instruct camera positioning apparatus 204 and/or camera 202 to photograph the customizable product in each of the determined non-survey positions relative to the customizable product. Camera positioning apparatus 204 may move camera 202 to each of the non-survey positions and camera 202 may take the photographs when in the non-survey positions.

In an embodiment, imaging computer 206 may cause customizable product 218 to be photographed in each of the positions identified in attribute view position table 502, detailed attribute cluster view positions table 602, and overview attribute cluster view positions table 604.

At block 410, based on determining that the particular non-survey photographic image is taken from the certain camera position that is near the particular non-survey camera position relative to the customizable product and based on the particular association that indicates that the particular non-survey camera position is associated with the particular customizable attribute, imaging computer 206 may store first data representing the particular non-survey photographic image in association with second data identifying the particular customizable attribute. For example, based on a particular association between a non-survey camera position and a customizable attribute and a determination that particular non-survey photographic image was taken from a position near the position identified in the particular association, imaging computer 206 may store data identifying the particular non-survey photographic image in association with data identifying the customizable attribute.

In some embodiments, the data identifying the particular non-survey photographic image may also be stored in association with data identifying the view type to which the non-survey photographic image corresponds. For example, if the particular association was retrieved from a data set identified as being associated with attribute views, such as attribute view position table 502, imaging computer 206 may store the non-survey photographic image with data indicating that the non-survey photographic image has a view type of attribute view. As another example, if data identifying the particular non-survey position is stored in association with data identifying the view type of the position as attribute view, imaging computer 206 may store the non-survey photographic image with data indicating that the non-survey photographic image has a view type of attribute view.

The data identifying the particular non-survey photographic image may also or instead be stored in association with data identifying the attribute option to which the particular non-survey photographic image corresponds.

A manufacturer may specify that an attribute option associated is a default attribute option for a customizable attribute and customization specification 212 may indicate that the attribute option is the default attribute option for the customizable attribute. In some embodiments, based on a determination that the certain camera position is associated with an attribute option that is a default attribute option for the corresponding customizable attribute, imaging computer 206 may store data identifying a particular non-survey photographic image, which is determined based on the certain camera position, in association with data indicating that the particular non-survey photographic image is the default image for the corresponding customizable attribute.

An image may be determined to have been taken near a particular determined camera position relative to the customizable product if the image is determined to have been taken in the same position as the particular determined camera position or within a particular amount of distance from the particular determined camera position.

In one embodiment, imaging computer 206 may receive non-survey photographic images with data identifying the positions from which the non-survey photographic images were taken. In another embodiment, imaging computer 206 may determine that a non-survey photographic image was taken from a particular position based on a determination that the non-survey photographic image was received in response to the automating imaging computer 206 sending instructions to take a photographic image from the particular position. In another embodiment, imaging computer 206 may determine that a non-survey photographic image was taken from a particular position based on a feature of the non-survey photographic image itself, such as a static wall marker visible in the non-survey photographic image, where the position of the static wall marker is known.

FIG. 8 illustrates an example process of determining example automated imaging position data that may be used to obtain images of the customizable product and of storing images of the customizable product with imaging data. At block 802, for each marker of a set of markers, imaging computer 206 identifies portions of one or more survey photographic images that correspond to the marker. The portions of the one or more survey photographic images that correspond to the marker may be identified based on a comparison of image data in the portion of the one or more images with a stored marker specification corresponding to the marker. The stored marker specification may indicate features of each marker which may be used to identify the markers in the survey photographic images. For example, the stored marker specification may indicate that the design of a particular marker comprises geometric shapes with particular properties. Imaging computer 206 may determine that the geometric shapes in particular portions of the one or more survey photographic images have the same particular properties as indicated in the stored marker specification. Based on the determination that the geometric shapes in the particular portions have the same particular properties as indicated in the stored marker specification, imaging computer 206 may determine that the portions of the one or more survey photographic images are depictions of the particular marker to which the stored marker specification corresponds.

At block 804, for each marker of the set of markers, imaging computer 206 determines a non-survey position corresponding to the marker. Imaging computer 206 may determine a non-survey position corresponding to a marker by comparing the geometric properties of the design in the one or more portions of the survey images with geometric properties of the design of the corresponding marker as identified in the stored marker specification for the corresponding marker. The position of the markers may also be determined based further in part on information about the positions from which the survey photographic images were taken.

For example, imaging computer 206 may determine that a particular portion of a particular survey photographic image is a depiction of a particular marker. Based on a comparison of the marker design in the particular portion with the marker design identified in a stored marker specification corresponding to the particular marker, imaging computer 206 may determine that the position of the marker is a particular amount higher than the position the camera was in when the particular survey photographic image was taken and the marker was angled a particular amount upwards relative to the camera's position when the particular survey photographic image. The position of the marker may be determined by adjusting the values representing the known position of the camera when the photograph of the marker by a particular determined amount.

In some embodiments, markers may be recognized and the positions of the markers may be determined according to the approaches described in U.S. patent application Ser. No. 13/539,788, entitled Visualizing A Custom Product In SITU, filed Jul. 2, 2012, and which is hereby incorporated by reference herein in its entirety.

At block 806, for each marker of the set of markers, imaging computer 206 determines a non-survey camera position for photographing the location of the customizable product corresponding to the marker based on the determined position of the marker. The set of markers may be the set of markers detected by imaging computer 206 based on the survey photographic images of the customizable product. The location of the customizable product corresponding to a marker may be an area of the customizable product upon which the marker is located. The non-survey camera position may be a position from which imaging computer 206 has determined that the marker would appear sufficiently forward-facing and centered if photographed.

For example, imaging computer 206 may determine that the location of the marker corresponding to the attribute option of plastic for the customizable attribute of base material is (0, −90, 20) and that the marker is angled at an angle of 165' from a fixed location. The angling of the marker may be determined by calculating the surface normal of the marker based on the survey photographic images. Imaging computer 206 may apply a particular adjustment to the known position of the marker to determine the appropriate position of the camera for photographing the marker in a forward-facing and centered position. Imaging computer 206 may determine that the non-survey camera position for photographing the location of the customizable product corresponding to the marker is at a location of (0,−80,10), and angled at an angle of −15° from the fixed location.

At block 808, imaging computer 206 identifies, for each marker of the set of markers, the customizable attribute(s) and/or customization option(s) to which the marker corresponds. Imaging computer 206 may identify the customizable attributes and/or customization option to which a marker corresponds based on a marker specification corresponding to the marker. Imaging computer 206 may determine that a particular marker specification of marker specifications 232 corresponds to a particular detected marker during the marker detection phase. Based on a determination that the particular marker specification corresponds to a particular customizable attribute and/or customization option, imaging computer 206 may determine that the particular detected marker corresponds to the particular customizable attribute and/or customization option.

At block 810, imaging computer 206 stores, for each marker of the set of markers, the non-survey camera position corresponding to the marker in association with data identifying the customizable attributes and/or attribute option to which the marker corresponds. Attribute view position table 502 illustrates example of associations between camera positions, customizable attributes, and attribute options that are stored at by imaging computer 206. Attribute view position table 502 may store an association for each marker identified as being affixed upon customizable product 218.

The steps of blocks 806, 808, and 810 may be performed to determine an attribute view position for each marker. The steps of blocks 812, 814, 816, and 818 may be performed to determine at least one position for each cluster of marker.

At block 812, imaging computer 206 separates the set of markers into one or more marker groups based on the locations of the markers. Any of a variety of clustering methods may be used to separate the markers into one or more marker groups. Imaging computer 206 may determine marker clusters by evaluating distances between individual markers and may select marker clusters where the distances between markers in a cluster re minimized and the distances between clusters are maximized.

Imaging computer 206 may store data identifying attribute clusters and the markers assigned to the attribute clusters. Attribute clustering data 504 comprises example attribute cluster data that may be stored by imaging computer 206. For example, associations 508 and 510 indicate that the marker corresponding to the customizable attributes of shade shape and shade edge pattern belong to the same cluster, which has an attribute cluster ID of 100.

At block 814, imaging computer 206 determines, for each marker group, a non-survey camera position for photographing the locations of the customizable product corresponding to the markers belonging to the marker group based on the determined positions of the markers belonging to the marker group. A non-survey camera position may be determined for each determined marker group. In an embodiment, a non-survey camera position for photographing the locations of the customizable product corresponding to the markers belonging to the marker group is determined by averaging the location of each of the locations of the makers in the marker group and averaging the surface normal for each of the markers in the marker group.

In some embodiments, both a detailed attribute cluster view position and an overview attribute cluster view position is determined for each marker group, where an overview attribute cluster view positions may be the position from which an attribute cluster view image is taken and a detailed attribute cluster view position is the position from which an attribute cluster view image is taken.

According to an embodiment, in a detailed attribute cluster image, the areas of customizable product 218 that are marked by the markers of a marker cluster are depicted in addition to a portion of the area surrounding the cluster of markers. The size of the area surrounding the cluster that is included in the image may be proportional to the size of the area covering the markers in the marker cluster. For example, if the markers belonging to the cluster are spread out over a large area of the customizable product, the size of the surrounding area included in the detailed attribute view cluster image may also be relatively large.

According to an embodiment, in an overview attribute cluster image of a particular cluster, the areas of customizable product 218 that are marked by the markers of the particular cluster are depicted in addition the entire product as visible from a particular perspective. A greater portion of the customizable product may be visible in an overview attribute cluster image than as compared to a detailed attribute view cluster image.

Determining the overview attribute cluster view position may comprise determining the boundaries of a convex hull that contains the customizable product. The position determined based on the locations of the markers in the marker cluster may be adjusted based on the determined boundaries of the convey hull. The position may be adjusted to ensure that certain boundaries of the convex hull are included within a photographic image taken from the determined position. For example, a photographic image captured from the position determined based on the locations of the markers in the marker cluster may only depict a small portion of the customizable product. The position initially determined based on the locations of the markers in the camera cluster may be adjusted based on the boundaries of the convex hull, such as by adjusting the angle and/or location of the camera position to include in the image an entire surface of the customizable product that is visible from a particular perspective. The determined boundaries of the convex hull may be used to determine which attributes are visible to the user from a specific orientation and to select particular camera orientations for the creation of an interactive asset view. Based on a determination that a particular group of attributes are best visible to the user from a particular camera orientation, the particular camera orientation may be selected and an interactive asset view may be automatically generated and linked to the particular group of attributes. The interactive asset view may comprise images taken from the particular camera orientation.

When a user selects an attribute or a group of attributes in the graphical user interface, images associated with the interactive asset view that is linked to the group may be shown. When an interactive asset view is selected in the graphical user interface, the user interface may highlight, select, or filter the list of attributes shown to the user. For example, when a particular interactive asset view is selected, only items relating to attributes belonging to the attribute group associated with the particular asset view may be displayed.

In one embodiment, the boundaries of a convex hull containing the customizable product are determined by projecting the shape of the customizable product in each of the survey photographic images and determining the intersection of the projected shapes.

At block 816, for each marker group, imaging computer 206 identifies the customization option(s) to which the markers in the marker group correspond. At block 818, imaging computer 206 stores, for each marker group, the determined camera position corresponding to the marker group in association with data identifying the customizable attributes to which the markers in the marker group correspond.

For example, imaging computer 206 may cluster markers 220 and 222 into the same marker group, attribute cluster 100, based on their proximity to each other. Imaging computer 206 may determine a detailed attribute cluster view position corresponding to attribute cluster 100 and an overview attribute cluster view position corresponding to attribute cluster 100. In response to determining the detailed attribute cluster view position corresponding to attribute cluster 100, imaging computer 206 may store association 608, which indicates that a position comprising a location of (5,−15, 20) relative to a fixed position at angle of rotation of −10° is the detailed attribute cluster view position corresponding to the marker cluster identified by attribute cluster ID 100. In response to determining the overview attribute cluster view position corresponding to attribute cluster 100, imaging computer 206 may store association 610, which indicates that a position comprising a location of (−5,−10, −20) relative to a fixed position at angle of rotation of −10° is the overview attribute cluster view position corresponding to the marker cluster identified by attribute cluster ID 100.

Imaging computer 206 may also determine attribute locations for each customizable attribute based on the survey photographic images. In some embodiments, the attribute location corresponding to a customizable attribute is the location of the center point of the marker corresponding to the customizable attribute. The attribute location corresponding to a customizable attribute may be annotated or emphasized in some other way in some or all product images corresponding to the customizable attribute. For example, the attribute location corresponding to a particular customizable attribute may be emphasized upon the attribute image, overview attribute cluster image, and/or detailed attribute cluster image corresponding to the customizable attribute when the image(s) are displayed.

Attribute locations table 606 illustrates example attribute locations determined for the customizable attributes of customizable product 218. For example, association 612 indicates that the attribute location corresponding to the customizable attribute of shade shape is located at location (10, −5, 40) upon customizable product 218.

FIGS. 3, 4, and 8 illustrate merely examples of processes for determining product images and imaging data. In other embodiments, positions may be determined for other types of views and using alternate processes.

According to various embodiments, one or more of the steps of the processes illustrated in FIGS. 3, 4, and 8 may be removed or the ordering of the steps may be changed. Additionally, although separate embodiments are discussed herein, any combination of embodiments and/or partial embodiments discussed herein may be combined to form further embodiments.

3. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine customizable hard-wired logic, ASICs, or FPGAs with customizable programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

Figure 9:
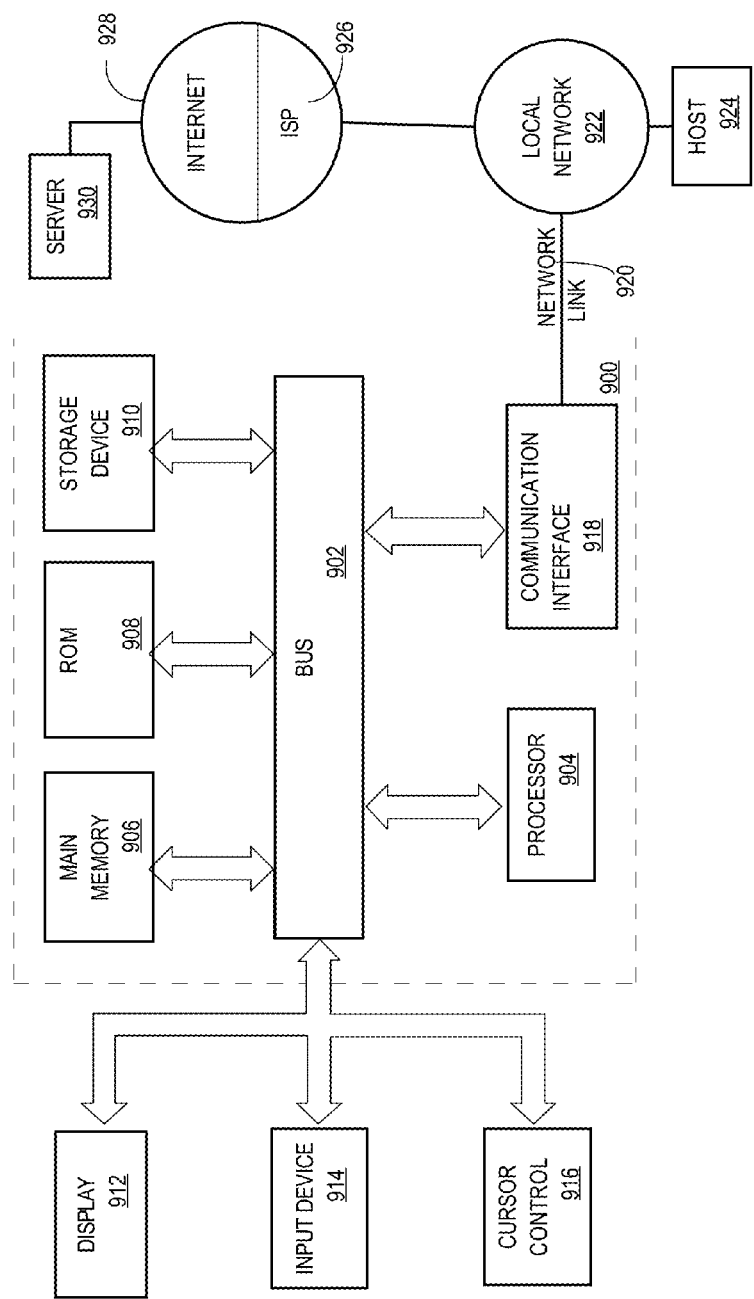
FIG. 9 is a block diagram that illustrates a computer system upon which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 9a, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In some embodiments, a customer interacts with computer system 900 via touch, for example, by tapping or gesturing over certain locations. A display screen of display 912 may also be capable of detecting touch.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a plurality of survey photographic images of a customizable product having one or more markers affixed upon the customizable product, wherein each of the plurality of survey photographic images depicts the same customizable product from a different survey camera position;
automatically determining, based on the plurality of survey photographic images, determined camera positions relative to the customizable product for capturing photographs of the customizable product;
storing associations between the determined camera positions and customizable attributes of the customizable product including a particular association that indicates that a particular determined camera position is associated with a particular customizable attribute;
obtaining a plurality of non-survey photographic images of the same customizable product without at least some of the one or more markers, including a particular non-survey photographic image taken from a certain camera position that is near the particular determined camera position relative to the customizable product;
based on determining that the particular non-survey photographic image is from the certain camera position that is near the particular determined camera position relative to the customizable product, and based on the particular association, storing first data representing the particular non-survey photographic image in association with second data identifying the particular customizable attribute;
wherein the method is performed using one or more computing devices.

2. The method of claim 1, wherein automatically determining the determined camera positions comprises:
determining that one or more portions of one or more particular survey photographic images depict a particular marker;
determining a location of the particular marker based on the one or more portions of the one or more particular survey photographic images;
determining the particular determined camera position relative to the customizable product based in part on the location of the particular marker;
and comprising:
storing the particular association that indicates that the particular determined camera position is associated with the particular customizable attribute based at least in part on a determination that the particular marker is associated with the particular customizable attribute.

3. The method of claim 2, further comprising determining the location of the particular marker based on a comparison of geometric properties of one or more objects in the one or more portions of the one or more particular survey photographic images with geometric properties of the particular marker.

4. The method of claim 2, wherein automatically determining the determined camera positions:
determining locations of a plurality of markers based on the one or more particular survey photographic images;
determining the particular determined camera position relative to the customizable product based at least in part on the locations of the plurality of markers.

5. The method of claim 2, wherein automatically determining the determined camera positions relative to the customizable product for capturing photographs of the customizable product comprises:
- determining locations of a plurality of markers based on the one or more particular survey photographic images;
- separating the plurality of markers into one or more marker groups based at least in part on the locations of the plurality of markers;
- determining the particular determined camera position relative to the customizable product based at least in part on locations of markers in a particular marker group of the one or more marker groups;
- forming the particular association to indicate that the particular determined camera position is associated with a plurality of particular customizable attributes associated with the markers in the particular marker group.

6. The method of claim 1, comprising:
- determining boundaries of a convex hull that contains the customizable product based on the plurality of non-survey photographic images;
- determining the particular determined camera position based on the boundaries of the convex hull that contains the customizable product.

7. The method of claim 1, further comprising:
- receiving, from a first computing device, a selection of the particular customizable attribute associated with the particular non-survey photographic image;
- in response to receive the selection, causing display of the particular non-survey photographic image at the first computing device.

8. The method of claim 1, comprising:
- forming the particular association to indicate that the particular determined camera position is associated with a particular customization option;
- determining that the particular non-survey photographic image is taken from the certain camera position that is near the same as the particular determined camera position relative to the customizable product;
- based on the determination that the particular non-survey photographic image is taken from the certain camera position that is near the particular determined camera position relative to the customizable product and based on the particular association that indicates that the particular determined camera position is associated with the particular customization option, storing the first data representing the particular non-survey photographic image in association with third data identifying the particular customization option.

9. The method of claim 8, comprising:
- receiving, from a first computing device, a selection of the particular customization option;
- in response to receive the selection of the particular customization option, causing display of the particular non-survey photographic image at the first computing device.

10. The method of claim 2, comprising:
- prior to receiving the plurality of survey photographic images:
  - receiving a customization specification specifying a set of customizable attributes of the customizable product;
  - storing, based in part on the customization specification, marker specifications including a particular marker specification;
- after receiving the plurality of survey photographic images:
  - determining that the one or more portions of one or more particular survey photographic images depict the particular marker based on the particular marker specification;
  - determining that the particular marker is associated with the particular customizable attribute based on the particular marker specification.

11. A data processing system comprising:
one or more processors;
image receiving unit configured to receiving a plurality of survey photographic images of a customizable product having one or more markers affixed upon the customizable product, wherein each of the plurality of survey photographic images depicts the same customizable product from a different survey camera position;
one or more non-transitory computer-readable storage media storing sequences of instructions which, when executed by the one or more processors, cause the processors to perform:
- automatically determining, based on the plurality of survey photographic images, determined camera positions relative to the customizable product for capturing photographs of the customizable product;
- storing associations between the determined camera positions and customizable attributes of the customizable product including a particular association that indicates that a particular determined camera position is associated with a particular customizable attribute;
- obtaining a plurality of non-survey photographic images of the same customizable product without at least some of the one or more markers, including a particular non-survey photographic image taken from a certain camera position that is near the particular determined camera position relative to the customizable product;
- based on determining that the particular non-survey photographic image is from the certain camera position that is near the particular determined camera position relative to the customizable product, and based on the particular association, storing first data representing the particular non-survey photographic image in association with second data identifying the particular customizable attribute.

12. The data processing system of claim 11, wherein the sequences of instructions which, when executed by the one or more processors, cause the processors to perform:
- determining that one or more portions of one or more particular survey photographic images depict a particular marker;
- determining a location of the particular marker based on the one or more portions of the one or more particular survey photographic images;
- determining the particular determined camera position relative to the customizable product based in part on the location of the particular marker;
- storing the particular association that indicates that the particular determined camera position is associated with the particular customizable attribute based at least in part on a determination that the particular marker is associated with the particular customizable attribute.

13. The data processing system of claim 12, wherein the sequences of instructions which, when executed by the one or more processors, cause the processors to perform:
- determining the location of the particular marker based on a comparison of geometric properties of one or more objects in the one or more portions of the one or more particular survey photographic images with geometric properties of the particular marker.

14. The data processing system of claim 12, wherein the sequences of instructions which, when executed by the one or more processors, cause the processors to perform:
   determining locations of a plurality of markers based on the one or more particular survey photographic images;
   determining the particular determined camera position relative to the customizable product based at least in part on the locations of the plurality of markers.

15. The data processing system of claim 12, wherein the sequences of instructions which, when executed by the one or more processors, cause the processors to perform:
   determining locations of a plurality of markers based on the one or more particular survey photographic images;
   separating the plurality of markers into one or more marker groups based at least in part on the locations of the plurality of markers;
   determining the particular determined camera position relative to the customizable product based at least in part on locations of markers in a particular marker group of the one or more marker groups;
   forming the particular association to indicate that the particular determined camera position is associated with a plurality of particular customizable attributes associated with the markers in the particular marker group.

16. The data processing system of claim 11, wherein the sequences of instructions which, when executed by the one or more processors, cause the processors to perform:
   determining boundaries of a convex hull that contains the customizable product based on the plurality of non-survey photographic images;
   determining the particular determined camera position based on the boundaries of the convex hull that contains the customizable product.

17. The data processing system of claim 11, wherein the sequences of instructions which, when executed by the one or more processors, cause the processors to perform:
   receiving, from a first computing device, a selection of the particular customizable attribute associated with the particular non-survey photographic image;
   in response to receive the selection, causing display of the particular non-survey photographic image at the first computing device.

18. The data processing system of claim 11, wherein the sequences of instructions which, when executed by the one or more processors, cause the processors to perform:
   forming the particular association to indicate that the particular determined camera position is associated with a particular customization option;
   determining that the particular non-survey photographic image is taken from the certain camera position that is near the same as the particular determined camera position relative to the customizable product;
   based on the determination that the particular non-survey photographic image is taken from the certain camera position that is near the particular determined camera position relative to the customizable product and based on the particular association that indicates that the particular determined camera position is associated with the particular customization option, storing the first data representing the particular non-survey photographic image in association with third data identifying the particular customization option.

19. The data processing system of claim 18, wherein the sequences of instructions which, when executed by the one or more processors, cause the processors to perform:
   receiving, from a first computing device, a selection of the particular customization option;
   in response to receive the selection of the particular customization option, causing display of the particular non-survey photographic image at the first computing device.

20. The data processing system of claim 12, wherein the sequences of instructions which, when executed by the one or more processors, cause the processors to perform:
   prior to receiving the plurality of survey photographic images:
      receiving a customization specification specifying a set of customizable attributes of the customizable product;
      storing, based in part on the customization specification, marker specifications including a particular marker specification;
   after receiving the plurality of survey photographic images:
      determining that the one or more portions of one or more particular survey photographic images depict the particular marker based on the particular marker specification;
      determining that the particular marker is associated with the particular customizable attribute based on the particular marker specification.

* * * * *